Figure 1:
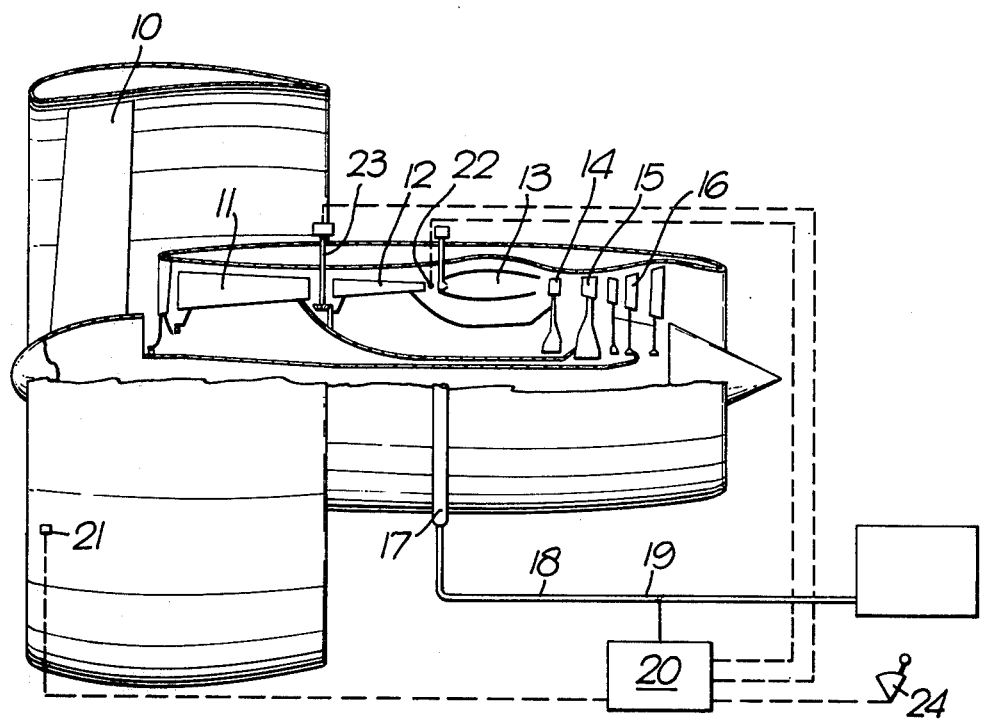

United States Patent [19]
Cantwell

[11] 4,444,008
[45] Apr. 24, 1984

[54] FUEL CONTROL SYSTEM FOR A GAS TURBINE ENGINE

[75] Inventor: Hugh F. Cantwell, Derby, England
[73] Assignee: Rolls-Royce Limited, London, England
[21] Appl. No.: 342,227
[22] Filed: Jan. 25, 1982
[30] Foreign Application Priority Data
    Mar. 4, 1981 [GB] United Kingdom .............. 8106808
[51] Int. Cl.³ .............................................. F02C 9/28
[52] U.S. Cl. ............................................... 60/39.281
[58] Field of Search .................................... 60/39.281
[56] References Cited
    U.S. PATENT DOCUMENTS
    3,123,128  3/1964  Zeisloft ....................... 60/39.281
    3,267,670  8/1966  McCombs ..................... 60/39.281
    3,768,249  10/1973  Lewis .......................... 60/39.281

Primary Examiner—Louis J. Casaregola
Attorney, Agent, or Firm—Cushman, Darby & Cushman

[57] ABSTRACT

A fuel control system for a gas turbine engine comprises a main fuel controller which varies the fuel flow to the engine in accordance with the engine pressure ratio and an idling fuel control arrangement. Control of idling fuel flow on a pressure ratio basis is somewhat wasteful of fuel. Therefore in the present invention the idling fuel control arrangement is arranged to control to a constant value of engine HP rotor speed. In the embodiment a variable bleed orifice is allowed to reduce the control pressure which operates the main fuel valve.

5 Claims, 2 Drawing Figures

FUEL CONTROL SYSTEM FOR A GAS TURBINE ENGINE

This invention relates to a fuel control system for a gas turbine engine.

There have been two basic types of fuel system in modern civil turbine engines. One type uses the rotational speed of the highest pressure compressor of the engine as its controlling parameter with an optional addition of engine inlet pressure and temperature while the other uses the ratio of the highest pressure compressor delivery pressure to engine inlet pressure as its controlling parameter. The latter system has certain advantages over the former in that it is relatively insensitive to changes in engine geometry which occur for instance because of differential expansions and to engine deterioration effects and is therefore better able to provide an accurate value of thrust as selected on the associated power lever angle.

One disadvantage of the pressure ratio type of controller has been that it has provided a ground idle speed for the engine which is variable depending upon the ambient conditions. This variation is unnecessary since it is only required that the ground idle speed should be at a predetermined level sufficient to drive the various accessories and to prevent any chance of flame out of the engine.

The present invention provides a fuel control system in which the advantages of pressure ratio are maintained together with a constant speed ground idle.

According to the present invention a fuel control system for a gas turbine engine comprises a main fuel controller which produces a controlling pressure which varies the fuel flow to the engine in accordance with the pressure ratio across at least one compressor of the engine to provide at least an approximation to a desired thrust level as set on a power lever and an idling fuel control arrangement which acts on the control pressure to over-ride the main controller to cause the fuel to flow to the engine to be controlled at ground idle to prevent the rotational speed of the high pressure compressor falling below a predetermined minimum the main fuel controller comprising two interconnected variable orifices whose size depends upon the engine inlet pressure andd the power lever angle respectively and which are supplied with the compressor delivery pressure and ambient pressure respectively, said control pressure comprising the pressure in the interconnection between said orifices.

The idling fuel control may open an aperture which allows the control pressure to be vented to ambient pressure.

Figure 2:
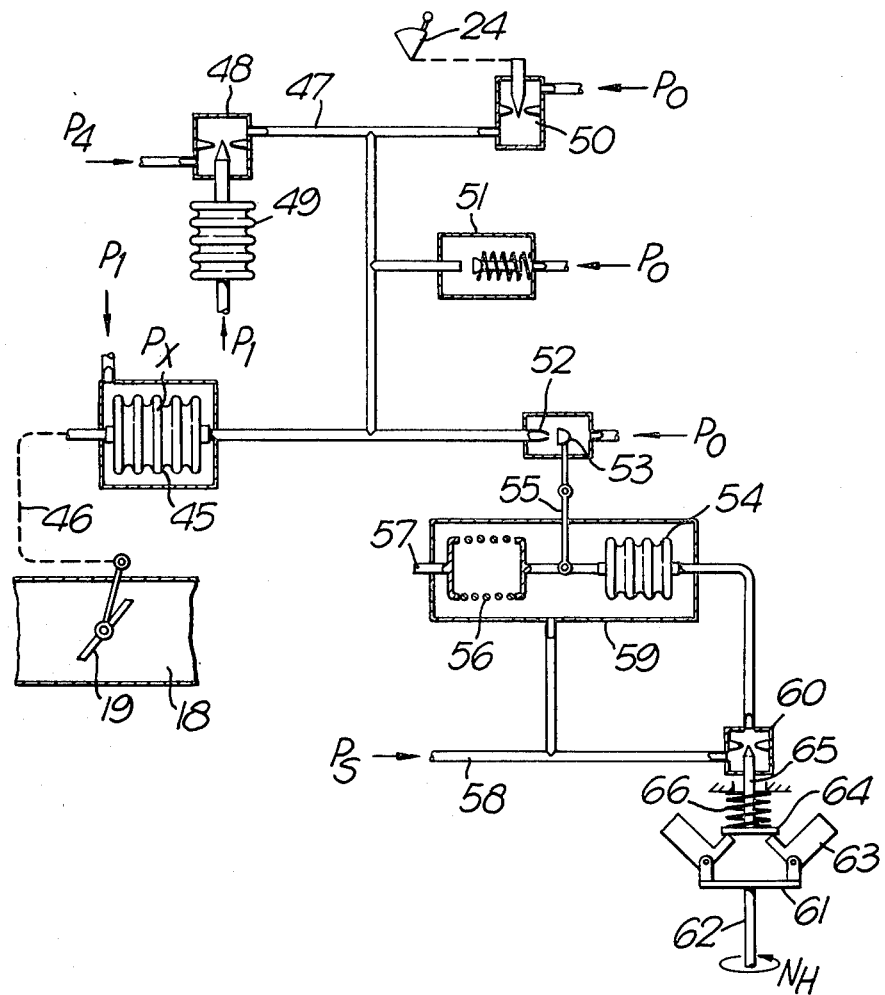

The invention will now be particularly described merely by way of example with reference to the accompanying drawings in which:

FIG. 1 is a diagrammatic view of a gas tubine engine and a fuel system in accordance with the invention, FIG. 2 is an enlarged diagrammatic view of a fuel control system in accordance with the invention.

In FIG. 1 there is shown a gas turbine engine consisting of a fan 10, intermediate pressure compressor 11, high pressure compressure 12, combustion system 13, high pressure turbine 14, intermediate pressure turbine 15, and low pressure turbine 16 all in flow series. Operation of the engine is conventional and is not further described.

In order to supply fuel to the combustion chamber 13 a manifold 17 is connected to a fuel feed pipe 18, the flow in which is controlled by a valve 19 which is shown for diagrammatic purposes as a simple butterfly valve. The position of the valve 19 is adjusted by the fuel control unit 20 in accordance with the number of inputs to provide the desired value of thrust from the engine. In the present instance the inputs to the unit 20 include one proportional to the pressure of the air entering the engine $P_1$ which is measured by transducer 21, one proportional to the delivery pressure $P_4$ of the high pressure compressor 12 which is measured by a transducer 22, one proportional to the rotational speed $N_h$ of the high pressure compressor which is taken from a shaft 23 driven from the compressor and one in accordance with the position (PLA) of the power lever 24. The power lever is the manual control by which the desired thrust can be set by the pilot.

FIG. 2 shows in greater detail how the fuel control unit 20 controls the fuel flow in the passage 18 by positioning the valve 19.

The main controlling function is performed by the formation of a control pressure $P_x$ within a bellows 45. The bellows 45 operates through a linkage indicated by 46 to vary the butterfly valve 19. The pressure $P_x$ is normally produced by splitting the difference between pressures $P_4$ and $P_o$ in a duct 47. A variable restrictor 48 is controlled by a bellows 49 which is connected to the engine inlet pressure $P_1$ and a further restrictor 50 is connected to be varied in accordance with the setting up power lever angle 24.

The pressure in the passage 47 therefore becomes $P_4$ f ($P_1$, PLA). Under normal circumstances this pressure is compared with $P_1$ by bellows 45 that is $P_x$ is made to equal $P_1$ therefore $P_1 = P_4$ f ($P_1$, PLA) or $P_1/P_4 = f$ ($P_1$, PLA).

As a further refinement of the system a solenoid controlled aperture 51 may be provided which can allow the passage 47 to bleed in a controlled manner to ambient air pressure. In this way a flight or ground idle may be produced.

This system has the disadvantage that the ground idle speed is controlled to produce a desired pressure ratio. Therefore in the present invention a further servo controlled orifice 52 is provided which can allow the passage 47 to vent to ambient pressure. The orifice 52 is controlled by a valve 53 whose position depends upon the extension of a bellows 54. The bellows actuate the lever 55, on which the valve 53 is supported, in opposition to a spring 56 which may be adjusted by a screw 57.

In order to provide the pressure differential across the bellows 54 which operates the idling control arrangement a servo pressure $P_s$ is supplied through a duct 58 directly to the chamber 59 within which the bellows 54 operates and also to the interior of the bellows 54 through a variable orifice 60. The orifice 60 is varied by a flyweight governor consisting of a rotary support 61 connected to a shaft 62 which rotates at a speed proportional to that of the high pressure rotor of the engine, the support 61 carrying a number of flyweights 63. The flyweights bear against a plate 64 which carries a needle valve 65 and which is spring loaded by a coil spring 66 against the load of the flyweights. In operation therefore the pressure entering the inside of the bellows 54 will be less than $P_s$ by an amount which will depend upon the speed of the high pressure rotor of the egine. Therefore as required the differential pressure across the bellows 54 will depend upon $N_h$ and hence orifice 52 will be opened and closed in such a way as to cause $P_x$ to vary to maintain a constant engine speed at the ground idle conditions.

Any increases in the power lever setting above the ground idle condition will cause an increased fuel flow to the engine which will take the high pressure rotor speed well above the value to which the orifice 52 attempts to control it. Under normal operation therefore the orifice 52 will be closed and the fuel system will operate in a manner unaffected by the idling control unit.

As described above the fuel control system incorporates an existing main controller and utilises control inputs proportional to the high pressure rotor speeds which are already present in the units. This may lead to some slight inaccuracies since for instance the pressure differential across the bellows 54 would in practice be a difference in fuel pressure which would vary to some extent with the fuel density. However, precisely accurate control of the engine at a pre-determined speed at ground idle is not vital and only a reasonable accuracy of control is required.

It will be appreciated that although the embodiment described above is a convenient modification of an existing system it will be quite possible to design a system from scratch to incorporate the principle of the invention in which case the detailed layout could well be different.

Again, although the engine described with reference to FIG. 1 is a three-shaft engine, the principle of the invention is clearly applicable to two or even one shaft engines.

I claim:

1. A fuel control system for a gas turbine engine having a high pressure compressor comprising:
   a power lever selectively operable to a power lever angle for a desired engine thrust level;
   a main fuel control unit for varying fuel flow to the engine in accordance with a ratio between engine inlet pressure and compressor delivery pressure to provide an approximation of the desired thrust level as set by the power lever angle of said power lever, said main fuel control unit including a first variable orifice means controlled by the ratio of engine inlet pressure and compressor delivery pressure and having an outlet for a modified compressor delivery pressure, a second variable orifice means controlled by said power lever and having an outlet for a modified ambient pressure, means interconnecting said outlet of said first orifice means with the outlet of said second orifice means to provide a control pressure for said main fuel controller unit based on a function of said modified compressor delivery pressure and said modified ambient pressure, means operable by said control pressure of said main fuel control unit to vary the fuel to the engine; and
   an override idling fuel control unit operable only at ground idle for controlling the control pressure of said main fuel control unit to prevent rotational speed of the high pressure compressor falling below a predetermined minimum, said override idling fuel control unit being operatively controlled by rotational speed of the high pressure compressor to vary the control pressure of said main control unit in accordance therewith when speed of the high pressure compressor is below a normal operating value.

2. A fuel control system as claimed in claim 1 in which said override idling fuel control unit includes a variable orifice means operable when speed of the high pressure compressor is below the normal operating value, said last-mentioned variable orifice means being operatively connected to said interconnecting means and having a bleed to ambient pressure whereby said control pressure in said interconnecting means may be variably bled to ambient pressure.

3. A fuel control system as claimed in claim 2 in which said override idling fuel control unit includes a bellows and a spring, said bellows and said spring being operatively connected to said variable orifice means for varying the same, and means for applying a pressure differential proportional to rotational speed of the high pressure compressor across said bellows.

4. A fuel control system as claimed in claim 3 including means to adjust tension of said spring so as to vary minimum speed.

5. A fuel control system as claimed in claim 3 in which said idling fuel control unit includes a flyweight governor controlled valve, a source of servo pressure operatively connected across said bellows, and means controllable by said flyweight governor controlled valve for varying said servo pressure to said bellows.

* * * * *